US012116836B2

(12) United States Patent
Rissone

(10) Patent No.: US 12,116,836 B2
(45) Date of Patent: Oct. 15, 2024

(54) DOOR VIEWER COVER

(71) Applicant: Robert Rissone, Rochester, NY (US)

(72) Inventor: Robert Rissone, Rochester, NY (US)

( * ) Notice: Subject to any disclaimer, the term of this patent is extended or adjusted under 35 U.S.C. 154(b) by 0 days.

(21) Appl. No.: 16/007,985

(22) Filed: Jun. 13, 2018

(65) Prior Publication Data

US 2018/0363363 A1 Dec. 20, 2018

Related U.S. Application Data

(60) Provisional application No. 62/519,328, filed on Jun. 14, 2017.

(51) Int. Cl.
*E06B 7/30* (2006.01)

(52) U.S. Cl.
CPC .................................... *E06B 7/30* (2013.01)

(58) Field of Classification Search
CPC ............................ E06B 7/30; E06B 2007/305
USPC ................................... 49/171; 411/508, 509
See application file for complete search history.

(56) References Cited

U.S. PATENT DOCUMENTS

| | | | | | |
|---|---|---|---|---|---|
| 177,432 | A * | 5/1876 | Smith | | |
| 593,993 | A * | 11/1897 | Elwood | | |
| 2,124,525 | A * | 7/1938 | Frankel | E06B 7/30 | 49/171 |
| 2,184,250 | A * | 12/1939 | Chaffee | F16B 5/125 | 24/295 |
| 2,304,995 | A * | 12/1942 | Frankel | E06B 7/30 | 49/171 |
| 2,999,523 | A * | 9/1961 | Amdur | E05B 1/0061 | 16/402 |
| 3,734,360 | A * | 5/1973 | Brown | B65D 47/20 | 222/537 |
| 2008/0050202 | A1* | 2/2008 | Liu | F16B 5/0657 | 411/508 |
| 2011/0099907 | A1* | 5/2011 | Anderson | E06B 7/30 | 49/171 |
| 2013/0036675 | A1* | 2/2013 | Burton | E06B 7/30 | 49/386 |

FOREIGN PATENT DOCUMENTS

| | | | | |
|---|---|---|---|---|
| FR | 2345577 A1 | * | 10/1977 | E06B 7/30 |
| FR | 2442949 A1 | * | 6/1980 | E06B 7/30 |
| JP | H0616693 U | * | 3/1994 | E06B 7/30 |
| JP | 3084957 U | * | 4/2002 | E06B 7/30 |

OTHER PUBLICATIONS

Machine translation of FR 2345577.*

* cited by examiner

*Primary Examiner* — Marcus Menezes
(74) *Attorney, Agent, or Firm* — Nixon & Vanderhye P.C.

(57) ABSTRACT

A door viewer cover includes a base with a hole through the thickness of the base. The hole is sized to mate with a door viewer to allow a user to look through the hole and thus the door viewer. The hole is offset from a center of the base. A cover is stacked on the base so that the thickness of the cover and the thickness of the base are in series while the base and the cover have an overall parallel relationship. The cover is sized to completely block the hole to prevent looking through the hole. A connection between the base and the cover allows the base and the cover to pivot with respect to one another while maintaining the parallel relationship between the cover and the base.

13 Claims, 9 Drawing Sheets

DOOR VIEWER COVER

This application claims priority to provisional application No. 62/519,328 filed Jun. 14, 2017, the entire contents of which are hereby incorporated by reference.

BACKGROUND

Doors, such as hotel doors, often include a door viewer that allows someone on the interior side of the door to see what is on the outside of the door without opening the door. Door viewers often are threaded together from opposite sides of the door using a coin or large flat head screw driver from the inside of the door. Door viewers typically include a lens that allows the user inside the door to view a wide range (angle) outside of the door and/or improve the user's view of outside the door. The same lens may make the door viewer more difficult to use in reverse.

However, a reverse door viewer can compensate for the lens and allow someone on the outside of the door to use the door viewer in reverse, which can be an unwanted invasion of privacy. Such a reverse door viewer can include a camera, resulting in further invasion of privacy.

Also, door viewers can be removed, leaving behind a hole in the door. Without the lens associated with the door viewer, invasion of privacy becomes easier because a reverse door viewer is simpler or even unnecessary. Alternatively, the interior portion of the door viewer could be removed, which may not be noticed when entering the door. The outer half of the door viewer could then be removed with little difficulty and a viewing device could be inserted through the hole.

To reduce the likelihood of a door viewer being removed, the threads can include well-known thread locking adhesive to make unthreading more difficult.

Some door viewers include a cover on the inside that can prevent using a door viewer in reverse, but known covers include problems. For example, known covers may be an integral component of the door viewer. If the cover becomes damaged and needs to be repaired or replaced, it is often necessary to remove the entire door viewer. Removing the entire door viewer to replace the cover may be undesirable. Also, removing the door viewer can be difficult if thread locking adhesive has been applied to the threads, and damage to the door could result when the thread locking adhesive is broken.

If the door viewer includes an integral cover, it may be necessary to compromise the installation of the door viewer. If the door viewer is hinged, it is preferable to have the hinge installed at the top of the door viewer so that gravity tends to keep the door viewer cover in the closed position. However, it may be impractical to adequately thread the opposed pieces of the door viewer together while maintaining the hinge at the top of the door viewer because the hinge will rotate around the door viewer with the threading action, and it is difficult to predict the position at which the threads will be tight.

BRIEF SUMMARY

The present disclosure relates to a cover for a door viewer that can be installed with newly installed door viewers or as a retrofit on a door with an existing door viewer.

An exemplary door viewer cover includes a first disc with a hole through the thickness of the first disc. The hole is sized to mate with a door viewer on an inside of a door to allow a user to look through the hole and thus through the door viewer, and a center of the hole is offset from a center of the first disc. A second disc is stacked on the first disc. The second disc is sized to cover at least the hole to block the user from looking through the hole. A pin connects the first disc to the second disc, where the pin is within an outer perimeter of the first disc and outside of the hole. The pin allows the first disc and the second disc to pivot around an axial length of the pin so that the second disc can move from a blocking position of the hole to a non-blocking position of the hole while maintaining a substantially parallel relationship between the first disc and the second disc.

Another exemplary door viewer cover includes a base with a first thickness and a hole through the first thickness. The hole is sized to mate with a door viewer to allow a user to look through the hole and thus the door viewer, and the hole is offset from a center of the base. A cover with a second thickness is stacked on the base so that the first thickness and the second thickness are in series and the base and the cover are parallel. The cover is sized to completely block the hole to prevent the user from looking through the hole. A connection between the base and the cover is within an outer perimeter of the base, within an outer perimeter of the cover and outside of the hole. The connection allows the base and the cover to pivot with respect to one another while maintaining the parallel relationship between the cover and the base.

Another exemplary door viewer cover includes a first component with a hole through the thickness of the first component. The hole is sized to mate with a door viewer on an inside of a door to allow a user to look through the hole and thus through the door viewer. A second component is stacked on the first component. The second component is sized to cover at least the hole to block the user from looking through the hole. A pin that connects the first component to the second component includes a split offset from a central axis of the pin. The pin is within an outer perimeter of the first component and outside of the hole. The pin allows the first component and the second component to pivot around the central axis so that the second component can move between a blocking position of the hole and a non-blocking position of the hole while maintaining a substantially parallel relationship between the first component and the second component.

Exemplary embodiments may include one or more of the following advantages. An exemplary door viewer cover may be installed on a door without removing an existing door viewer. Similarly, an exemplary door viewer cover that is damaged may be repaired or replaced without removing the door viewer and/or without damaging the door. An exemplary door viewer cover may be readily modified or replaced to match door hardware (such as a doorknob) or surrounding decor if the finish on the hardware or decor (such as a brass or nickel finish) is changed.

Other aspects, features, and advantages of this technology will become apparent from the following detailed description when taken in conjunction with the accompanying drawings, which are a part of this disclosure and which illustrate, by way of example, principles of this technology

DETAILED DESCRIPTION

The following description is provided in relation to several examples which may share common characteristics and features. It is to be understood that one or more features of any one example may be combinable with one or more features of the other examples. In addition, any single feature or combination of features in any of the examples may constitute additional examples.

Figure 18:
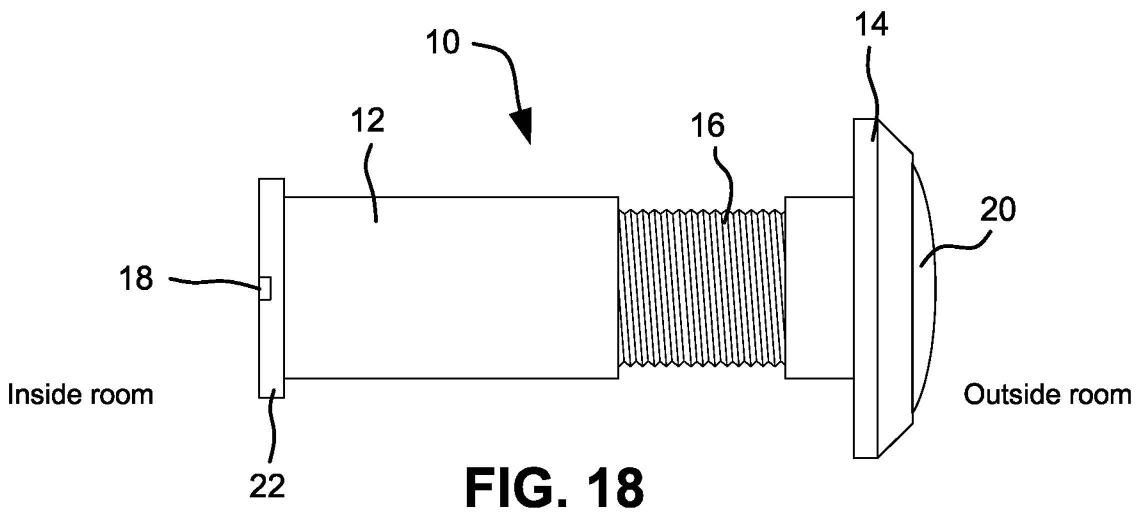
FIG. 18 (Prior Art)
FIG. 18 illustrates a door viewer.

FIG. 18 illustrates a door viewer 10 with an inner portion 12 and an outer portion 14. The inner portion 12 is connected to the outer portion 14 by threads 16. The inner portion 12 includes a slot 18 that receives a screwdriver or similar tool to tighten the threads 16. The outer portion 14 includes a lens 20. The inner portion includes a flange 22.

Figure 1:
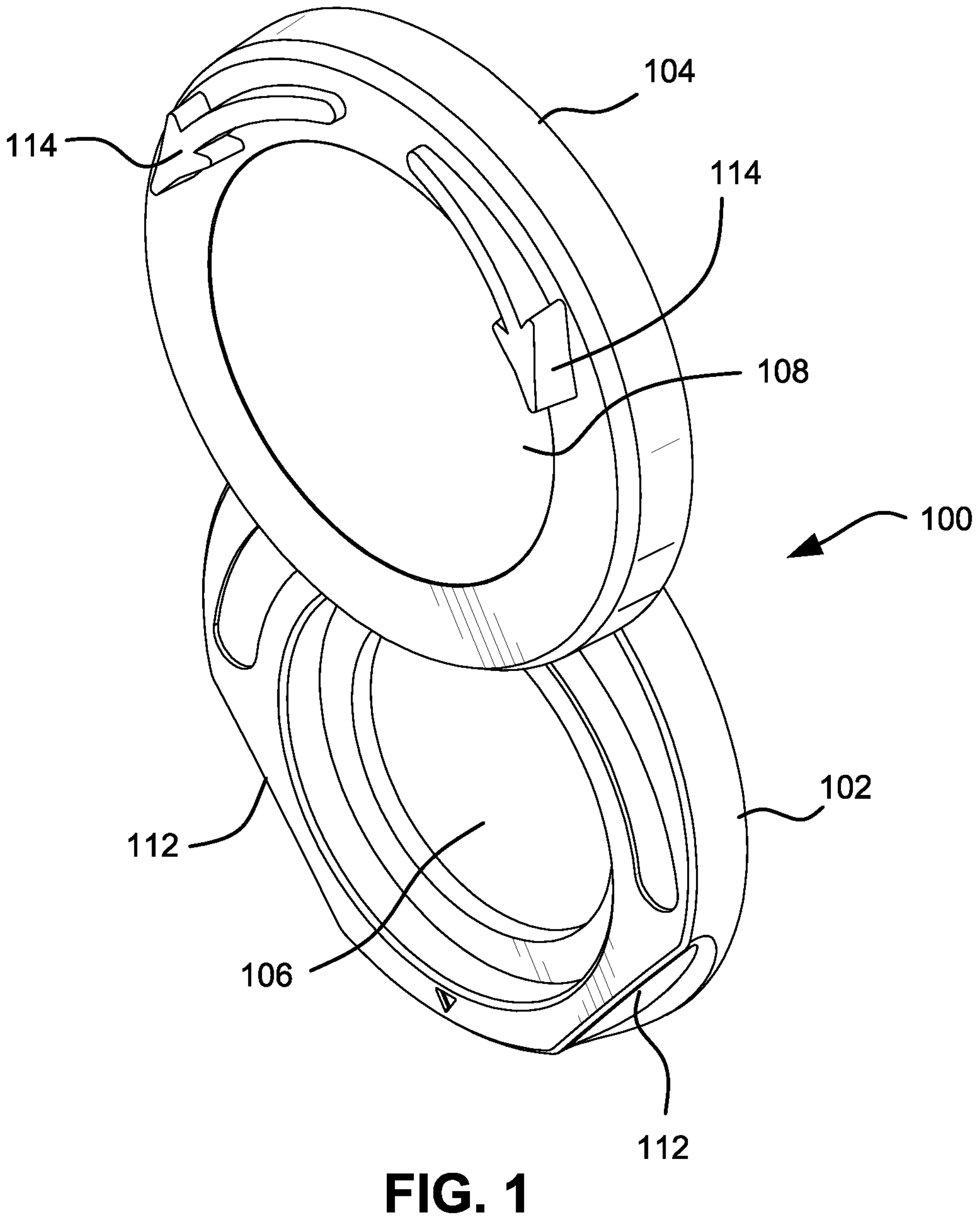
FIG. 1 is a perspective view of a door viewer cover in an open position.

FIG. 1 illustrates a door viewer cover 100 with a first component 102 and a second component 104. The first component 102 includes a through-hole 106 that is sized to interface with the inner portion 12 as detailed further below. As illustrated, both the first component 102 and the second component 104 have an overall disc or circular shape, but the first component 102 and the second component 104 need not have a disc or circular shape. Any shape that allows the first component 102 to interface with the inner portion 12 and any shape that allows the second component 104 to cover the through-hole 106 may be implemented. For example, the overall profile of both components could be one of a triangle, square, pentagon, hexagon, heptagon, octagon, or any other polygon. However, a circular profile may be aesthetically pleasing and/or readily manufactured.

In FIG. 1, the second component 104 is rotated with respect to the first component 102 so that the through-hole 106 is not obscured by the second component 104. An ornamental component 108 is disc-shaped and received in a blind hole 110 (illustrated in later-described figures). The ornamental component 108 could be any suitable shape (such as the shapes discussed above for the first component and the second component). The first component 102 includes an outer perimeter that differs from the outer perimeter of the second component 104, which may assist in moving from a closed position to an open position. The first component 102 includes angled deviations or scallops 112 in the outer perimeter, which may facilitate rotation when the second component 104 is in the closed position and a user presses the second component 104 adjacent at least one of the scallops 112. Indicators 114 provide a visual reference to indicate how the second component 104 is opened or closed. The indicators 114 are illustrated in the form of arrows and adjacent the scallops 112. The position of the indicators 114 with respect to the scallops 112 may allow a user to intuitively understand where to contact the second component 104 for easy manipulation. The indicators 114 may have a different finish (e.g., gloss) than the surrounding material (e.g., matte) so that the visual distinctiveness of the indicators is enhanced.

Figure 2:
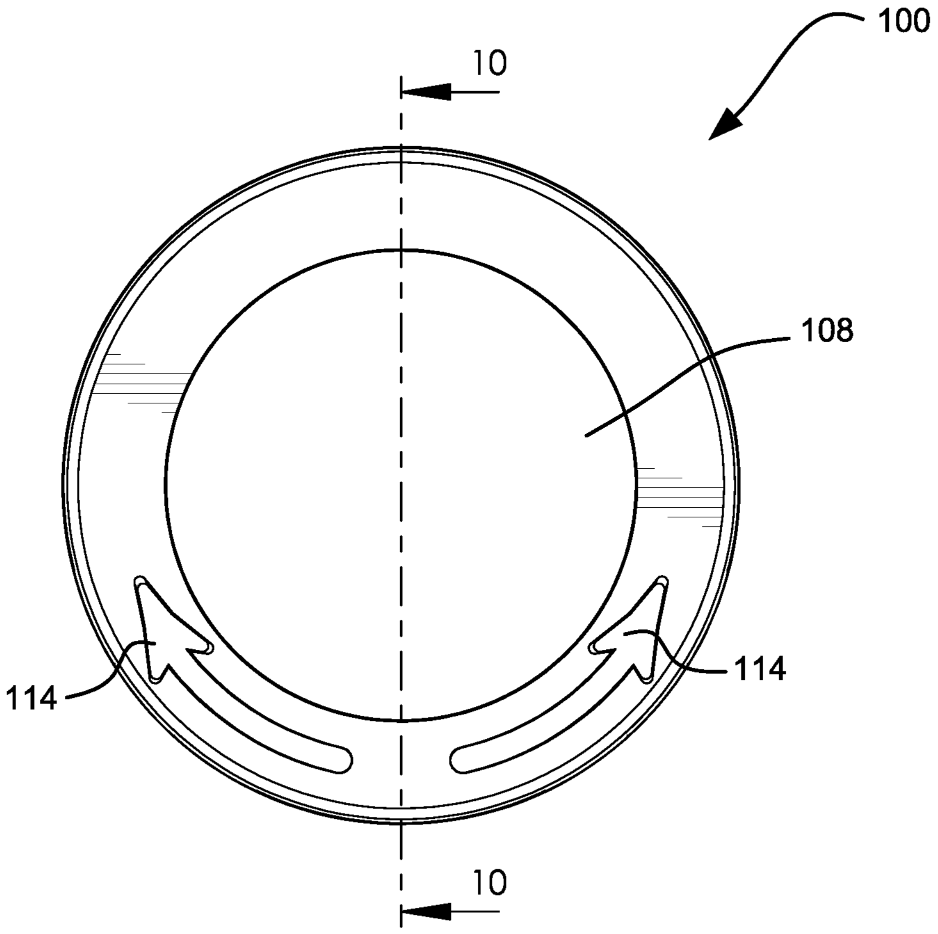
FIG. 2 is front view of a door viewer cover in a closed position.
Figure 3:
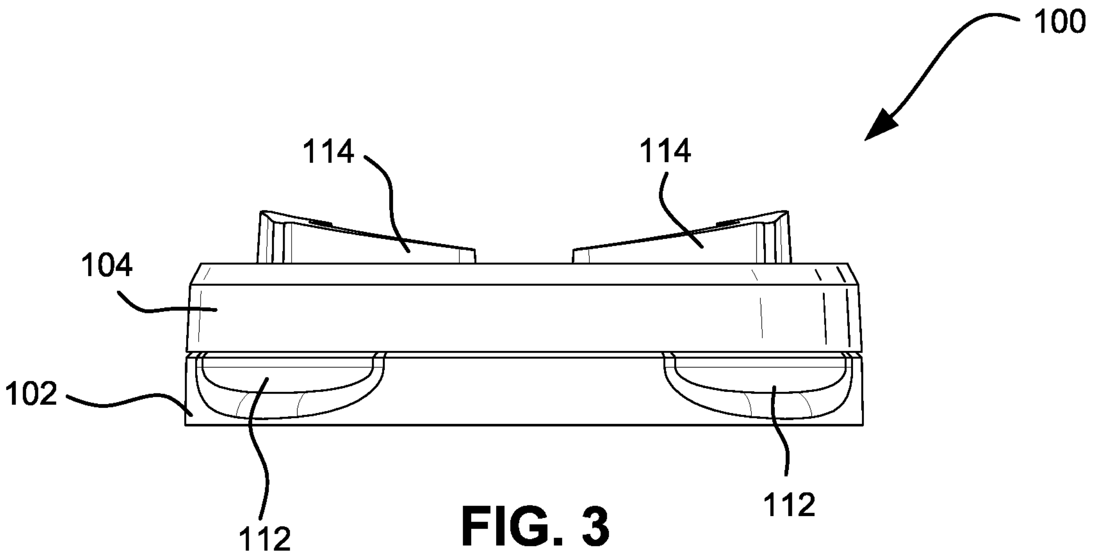
FIG. 3 is a bottom view of a door viewer cover in a closed position.
Figure 5:
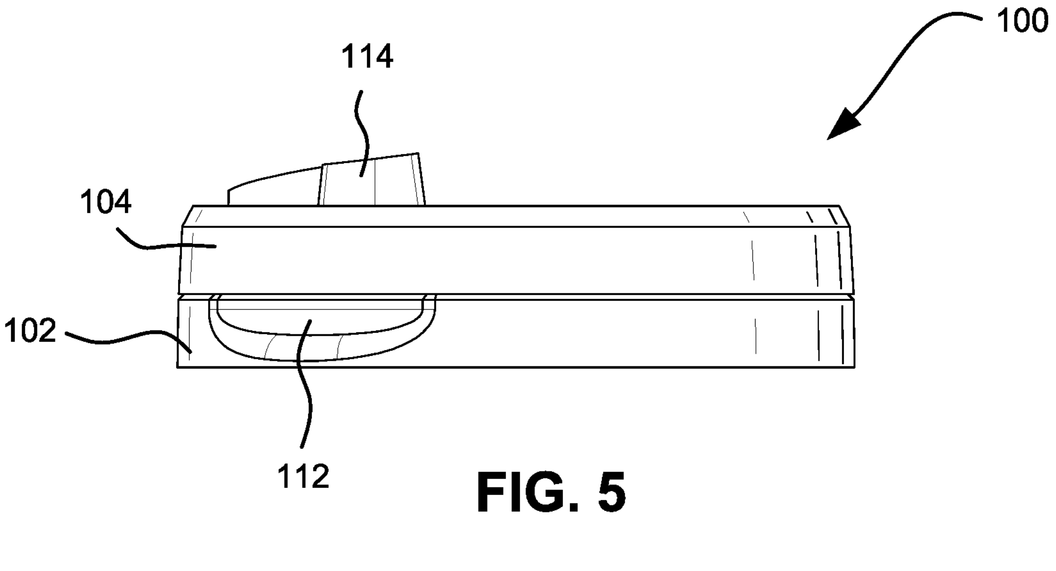
FIG. 5 is a side view of a door viewer cover in a closed position.

FIGS. 2, 3 and 5 illustrate the door viewer cover 100 from a front view, a bottom view and a side view, respectively. In each of these views, the door viewer cover 100 is in a closed position so that the through-hole 106 is obscured.

Figure 4:
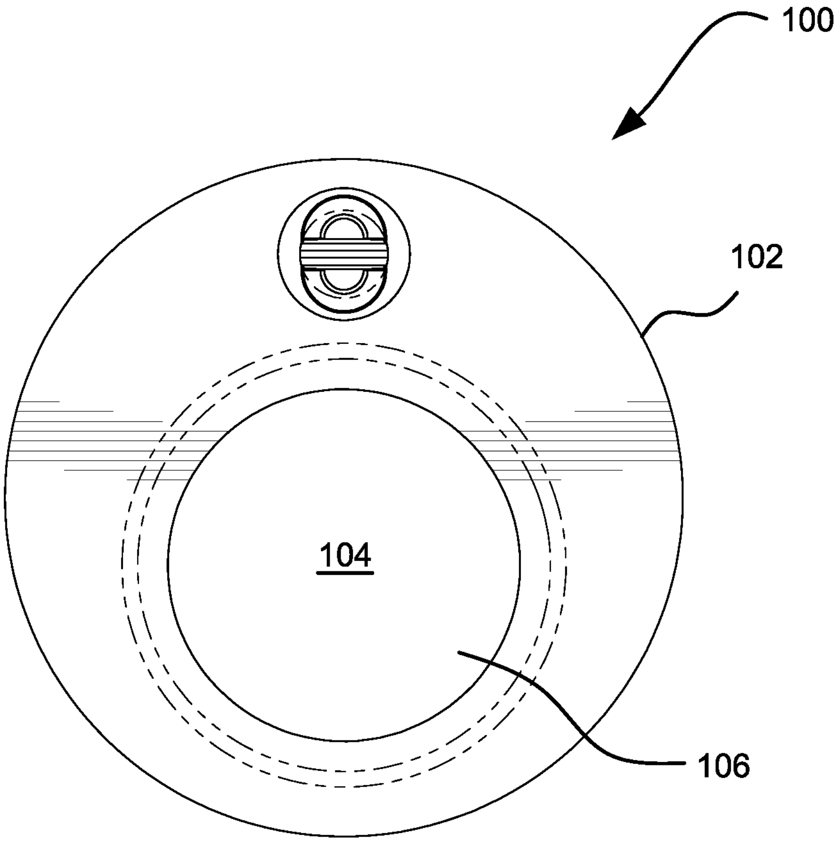
FIG. 4 is a rear view of a door viewer cover in a closed position.

FIG. 4 illustrates the door viewer cover 100 from a rear view.

Figure 6:
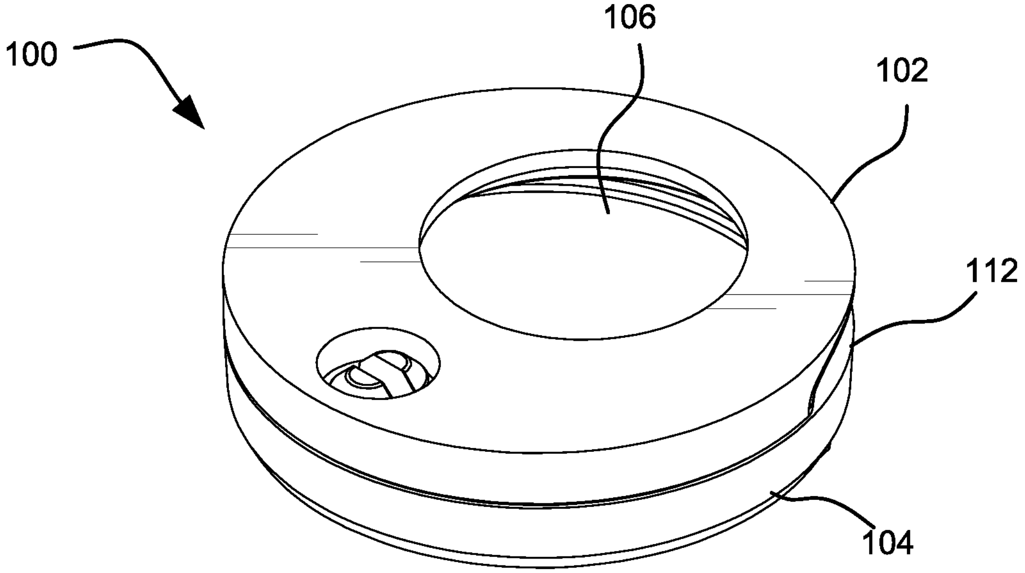
FIG. 6 is a rear perspective view of a door viewer cover in a closed position.
Figure 7:
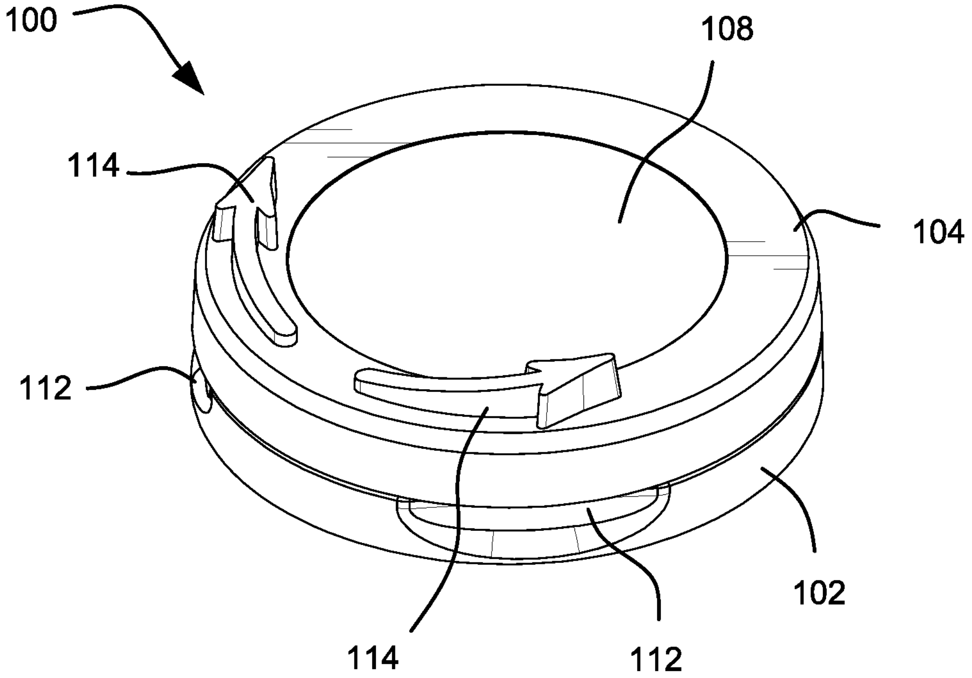
FIG. 7 is a front perspective view of a door viewer cover in a closed position.

FIGS. 6 and 7 illustrate the door viewer cover in opposed perspective views with the door viewer cover 100 in a closed position.

Figure 8:
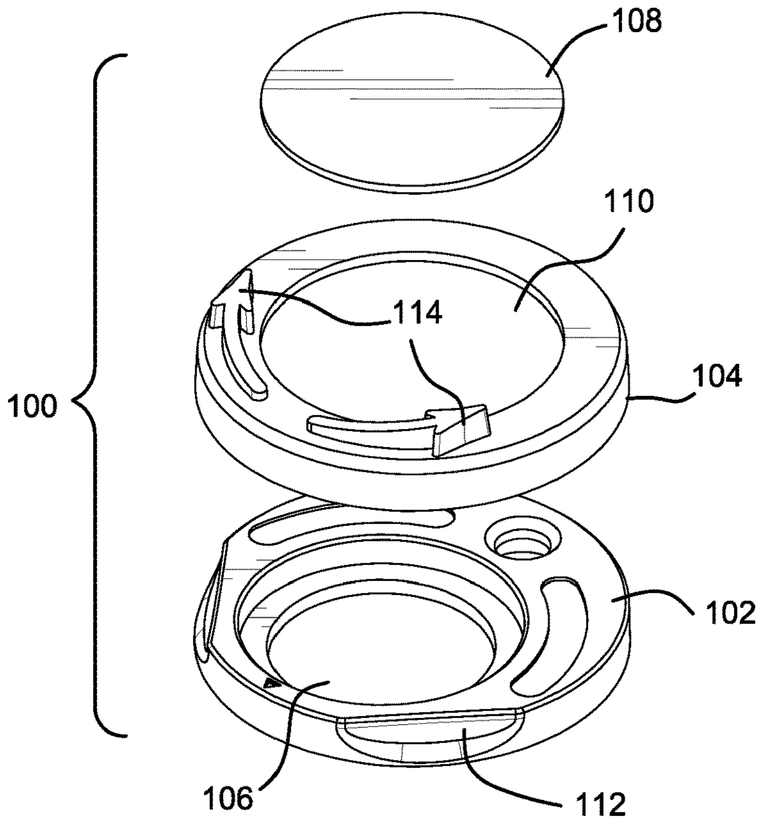
FIG. 8 is a front exploded perspective view of a door viewer cover in a closed position.
Figure 9:
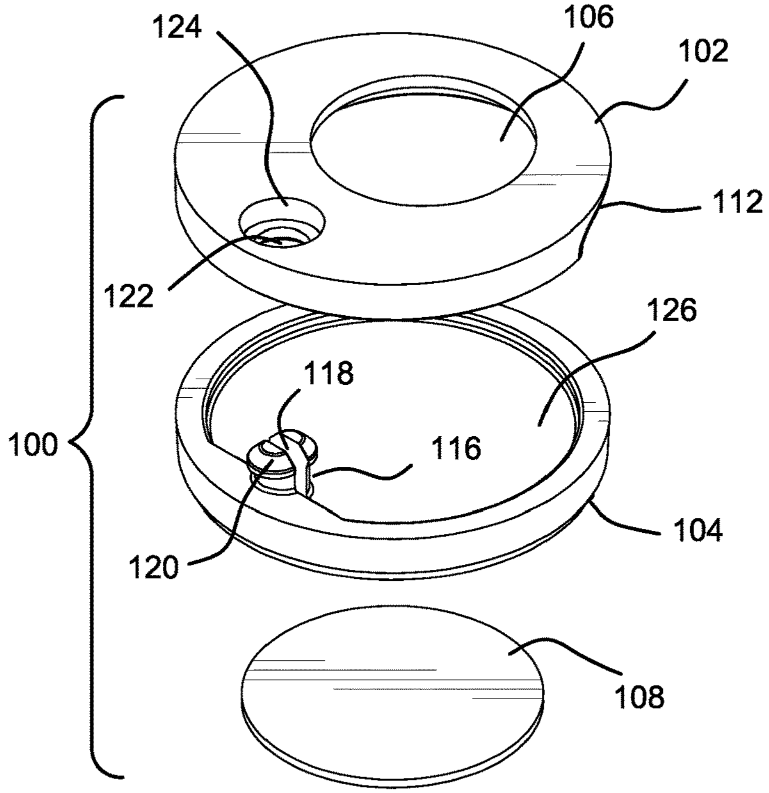
FIG. 9 is a rear exploded perspective view of a door viewer cover in a closed position.

FIGS. 8 and 9 illustrate components of the door viewer cover 100 in exploded views. Some aspects that are not visible in other views are the blind hole 110 and the attachment between the first component and the second component.

The blind hole 110 (see FIG. 8) is a shallow hole in the second component 104 sized to receive the ornamental component 108. The ornamental component 108 may be a disc of various types of materials and/or finishes (such as brass, nickel, chrome, wood, plastic, etc. with flat, gloss, etc.) chosen to match, or complement, the finish of the door hardware (such as the doorknob or hinges) or surrounding decor. But making the disc from metal may be advantageous because metal may be chosen that has a relatively high density, and thus weight, compared to the material of the second component 104 (e.g., plastic). Having a relatively heavy ornamental component 108 may tend to move the second component 104 into the closed position by gravity. The ornamental component 108 can be retained with any suitable retention mechanism (such as a snap fit or adhesive), but it may be preferable for the retention mechanism to allow for removal of the ornamental component 108 without damage to the door viewer cover 100. Doors may have their hardware replaced during redecoration or remodeling while retaining the underlying door. If the retention mechanism allows for removal the ornamental component 108 without damage to the door or the remainder of the door viewer cover 100, the ornamental component 108 can be replaced to match the finish of the door hardware or surrounding decor.

The connection between first component 102 and the second component 104 includes a post or shaft 116 that is a continuous, integral part of the second component 104. A split 118 extends along an axial direction of the shaft 116 so that a head 120 can be compressed and inserted into a through-hole 122 with a counter bore 124 in the first component 102. With this arrangement, the connection between first component 102 and the second component 104 forms a snap fit that allows for rotation about the shaft 116. The relative shapes illustrated for the head 120 and the counter bore 124 result in a snap fit that is considered permanent in that disassembly of the snap fit is likely to cause damage to the underlying components.

The relative positions of the shaft 116 and through-hole 122 may be reversed, but the illustrated positions may be advantageous. For example, by having the shaft 116 as part of the second component 104, the snap fit may be broken (e.g., the shaft 116 may be cut or snapped) to remove the second component 104 from the first component 102, which would allow the first component 102 to remain installed on a door. Then a new second component 104 could be installed.

A recess 126 on the back side of the second component 104 is also visible in FIG. 9. The recess 126 may reduce material needed to form the second component 104 and/or reduce surface area and thus potential friction between the first component 102 and the second component 104. Alternatively, the recess 126 may be omitted.

Figure 10A:
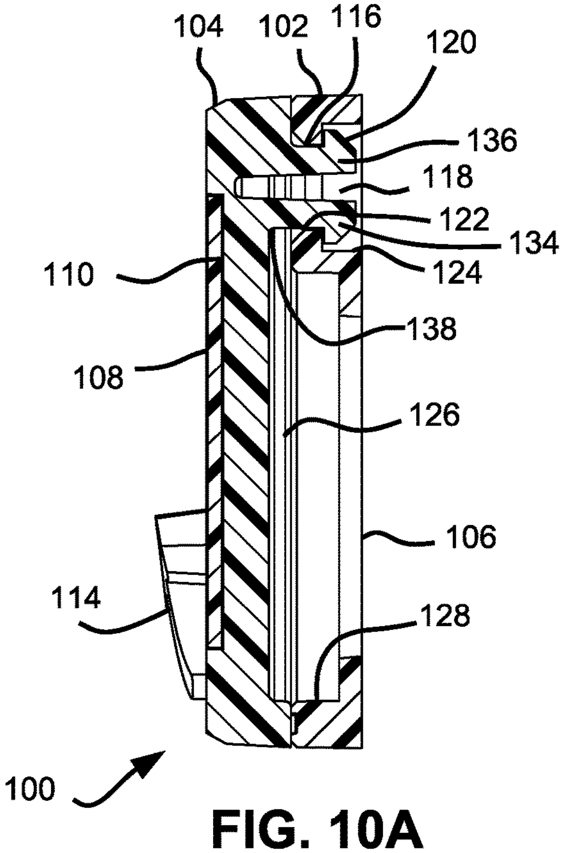
FIGS. 10A and 10B are sectional views taken along line 10-10 in FIG. 2.
Figure 11:
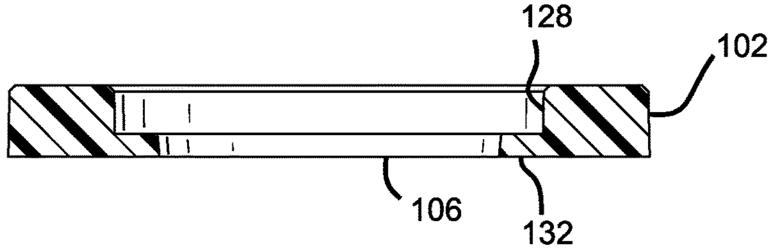
FIG. 11 is a sectional view of a component of a door viewer cover.
Figure 12:
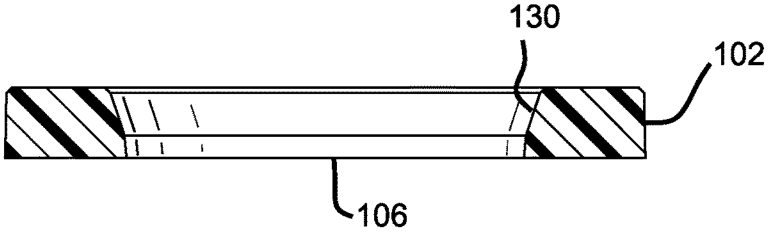
FIG. 12 is a sectional view of a component of a door viewer cover.
Figure 13:
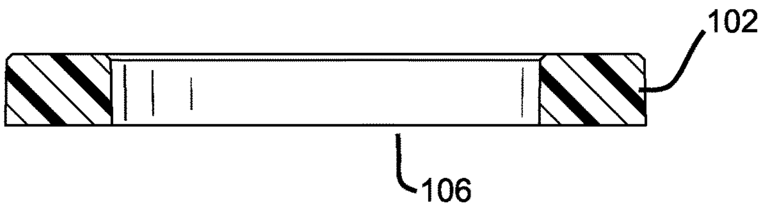
FIG. 13 is a sectional view of a component of a door viewer cover.

FIG. 10A is a cross-section taken along line 10-10 of FIG. 2. In addition to features described above, additional aspects of the through-hole 106 are evident. Here, a first implementation of the through-hole 106 is illustrated. In this implementation, a counter-bore 128 from the second component side is included in the through-hole 106. This is the same configuration as illustrated in FIG. 11, which is a cross section that omits the second component 104. FIG. 12 differs from FIG. 11 in that the counter-bore 128 is replaced with a counter-sink 130. FIG. 13 differs in that the through-hole 106 is straight through and includes neither a counter-bore nor a counter-sink.

Figure 10B:
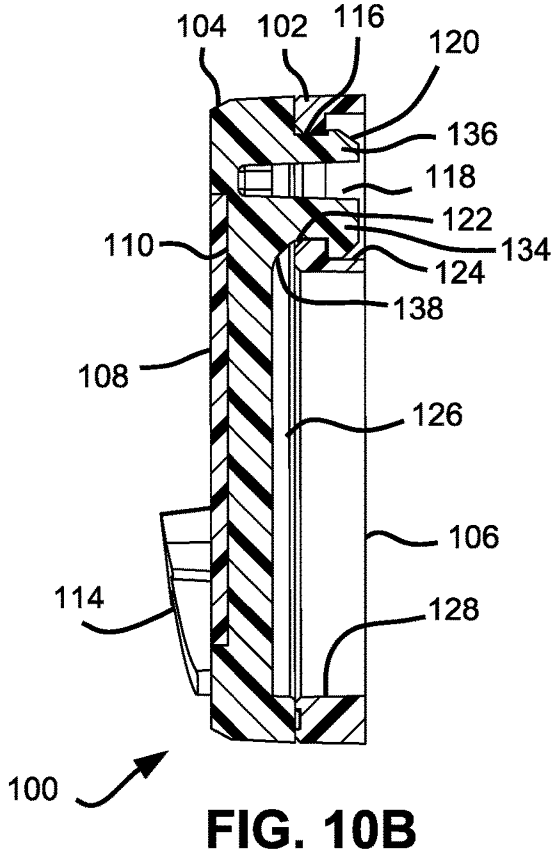

FIG. 10B is also a cross-section taken along line 10-10 of FIG. 2 but differs from FIG. 10A in two ways. First, the through-hole 106 corresponds to the configuration illustrated in FIG. 13. Second, the shaft 116, split 118 and head 120 are altered compared to the configuration of FIG. 10A. The split 118 is off-center from a central axis of the shaft 116 towards a radial outer side of the second component 104, which results in the inner section 134 of the shaft 116 being thicker than the outer section 136. The head 120 on the inner section 134 has more material and overhangs further than the head 120 on the outer section 136 (e.g., the head 120 is offset from the center of the shaft 116 towards the center of the through-hole 106). The radius 138 is much larger compared to FIG. 10A. Said differently, the inner section 134 and outer section 136 are not symmetrical. With one or more of these differences, the snap fit between the first component 102 and the second component 104 can be strengthened compared to FIG. 10A. With the shaft 116 being offset from the center of the second component 104, a lever arm is created that could be used to separate the second component 104 from the first component 102, resulting in bending at the shaft 116 that could lead to permanent deformation or breakage. Each of the differences noted in FIG. 10B may counteract the lever arm and may reduce the likelihood of undesirable deformation or breakage. The inner section 134 may provide more retention than the outer section 136, while the outer section 136 may provide more compliance (compared to the inner section 134 and compared to the configuration in FIG. 10A) to allow the snap fit to be engaged. Of course, if desired, one or more of the features could be reversed such that the outer section 136 is more resistant to breaking than the inner section 134.

FIGS. 14-17 illustrate various installation configurations of the door viewer cover 100. Some reference numbers are omitted from these figures for clarity.

Figure 14:
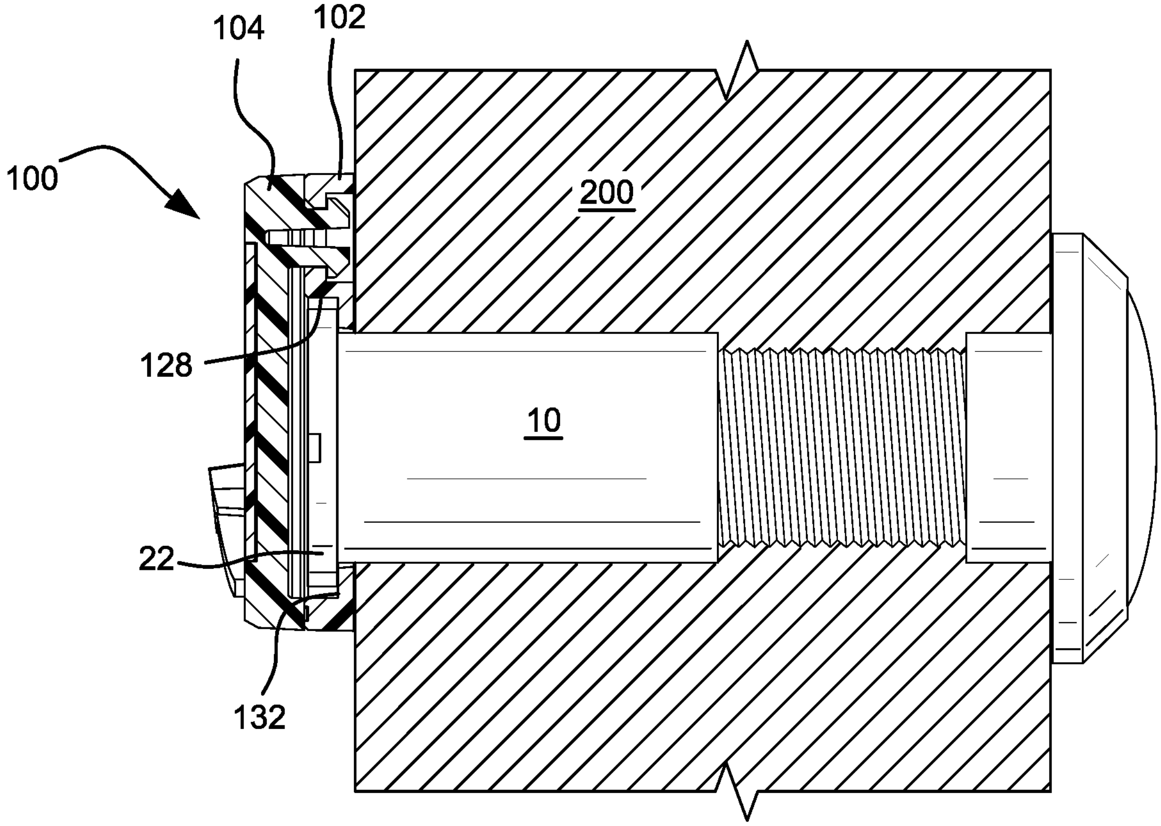
FIG. 14 illustrates a door viewer cover installed on a door with a door viewer, where the door and the door viewer cover are illustrated as a cross-section.
Figure 15:
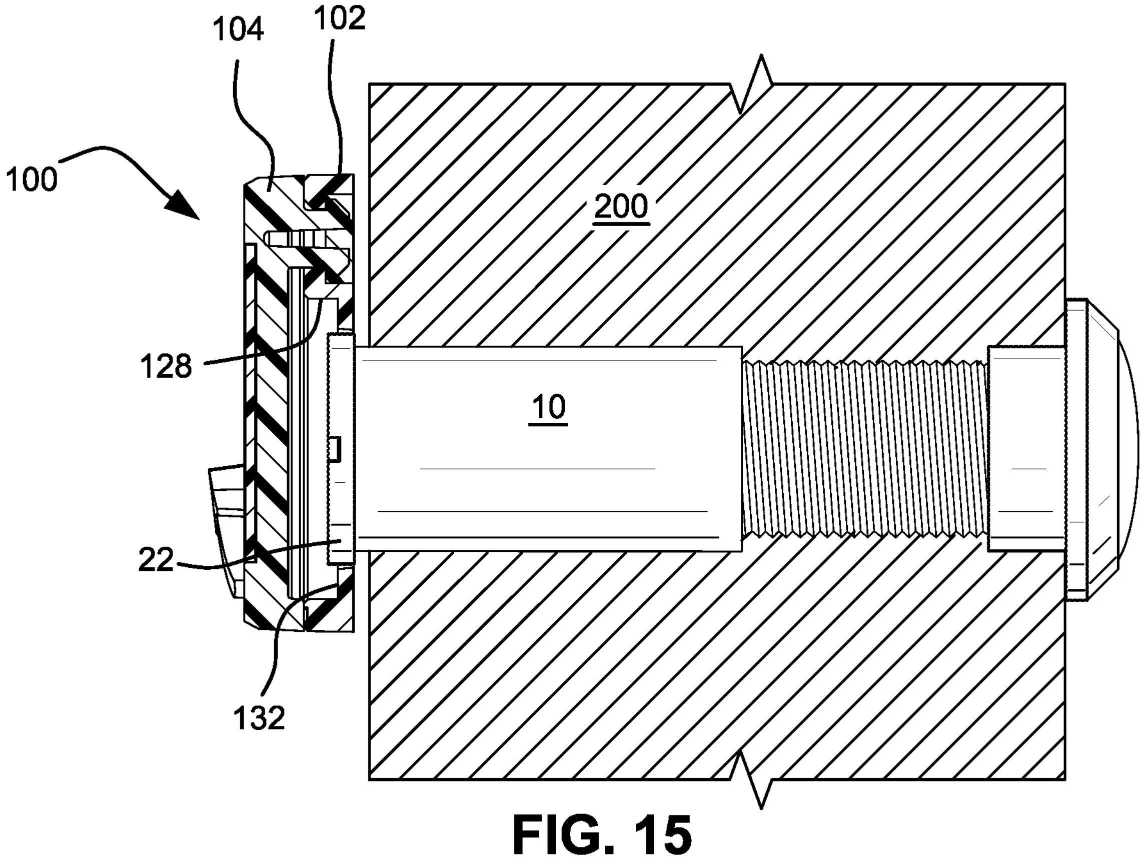
FIG. 15 illustrates a door viewer cover installed on a door with a door viewer, where the door and the door viewer cover are illustrated as a cross-section.

FIGS. 14 and 15 illustrate the version of the through-hole 106 with a counter-bore 128. In FIG. 14, the flange 132 created by the counter-bore 128 is sandwiched between the door 200 and the flange 22. This arrangement may provide mechanical retention of the door viewer cover 100 by the door viewer 10.

FIG. 15 differs from FIG. 14 in that the flange 132 is outside of the diameter of the flange 22, so there is no mechanical retention by the door viewer 10. In this configuration, and all other configurations, the door viewer cover 100 may be retained on the door 200 by adhesive. The adhesive may be provided on the door viewer cover 100 when manufactured, and may include a releasable backing. Alternatively, adhesive may be applied to the door 200 or the door viewer cover 100 when the door viewer cover 100 is installed, where the adhesive could be double sided tape or a flowable adhesive (such as liquid or gel). This configuration may allow the door viewer cover 100 to be installed on doors without the need to disassemble a preexisting door viewer 10.

Figure 16:
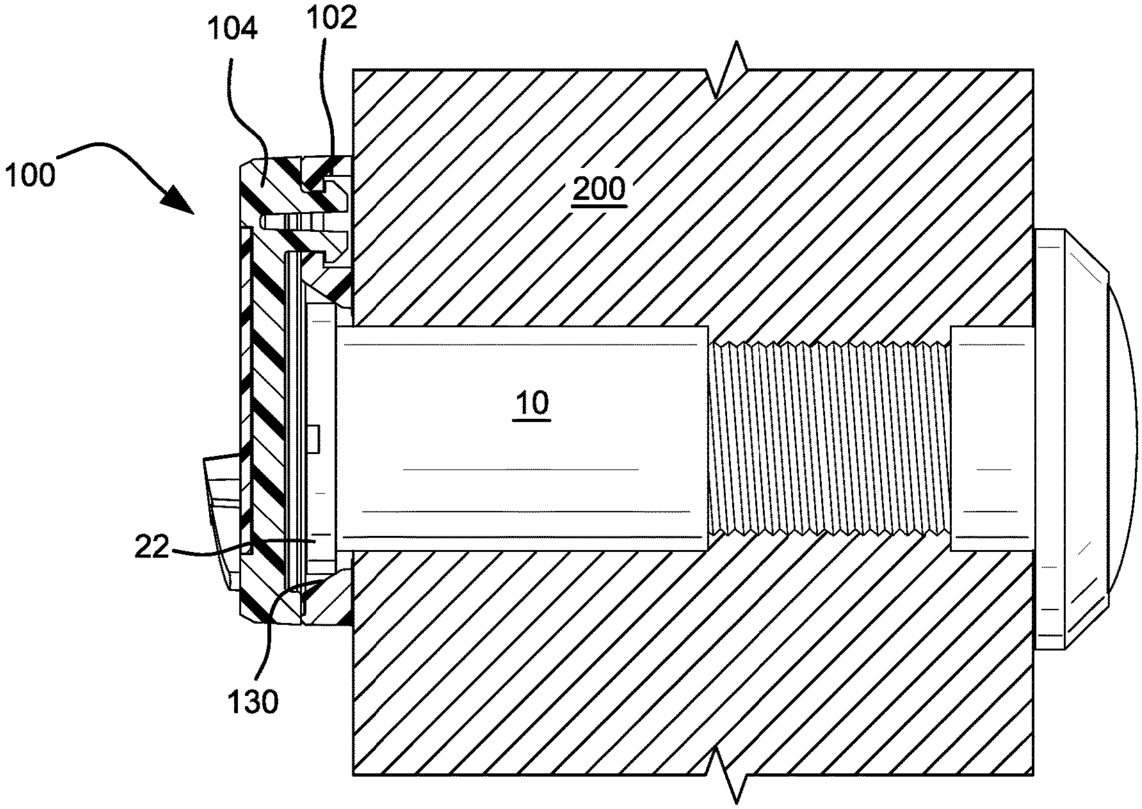
FIG. 16 illustrates a door viewer cover installed on a door with a door viewer, where the door and the door viewer cover are illustrated as a cross-section.

FIG. 16 illustrates the potential interaction between the flange 22 and the counter-sink 130. This arrangement may allow for mechanical retention by the flange 22 in a way that tends to center the through-hole 106 with respect to the flange 22 and while accommodating different diameters of the flange 22.

Figure 17:
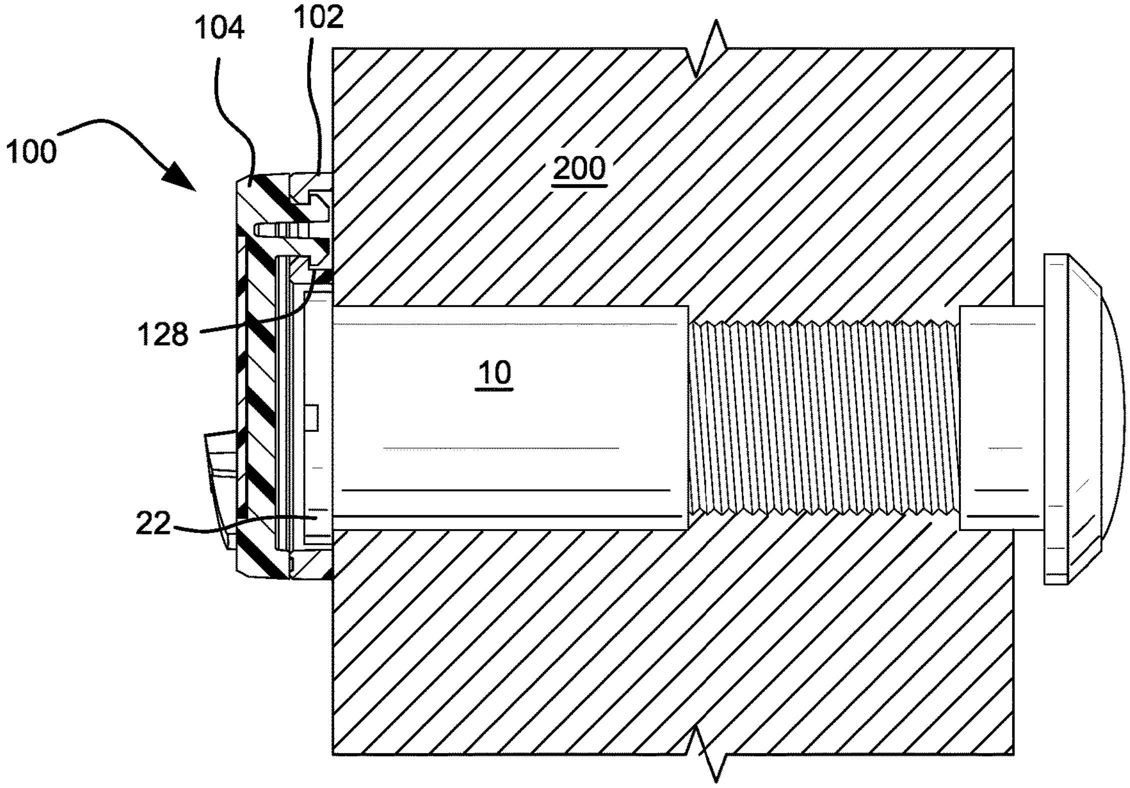
FIG. 17 illustrates a door viewer cover installed on a door with a door viewer, where the door and the door viewer cover are illustrated as a cross-section.

FIG. 17 is similar to FIG. 15, but without a flange 132. This configuration may allow the door viewer cover 100 to be installed on doors without the need to disassemble a preexisting door viewer 10.

Any of the configurations illustrated in FIGS. 14-17 may be installed on a door with an existing door viewer without disassembling the door viewer so long as the through-hole 106 is sized appropriately.

With the various configurations illustrated in FIGS. 14-17, different sizes or configurations of off the shelf the door viewers 10 can be accommodated, and each of the different configurations can be manufactured with a common mold. As should be appreciated from the figures, the second component 104 can be identical for each of the configurations illustrated in FIGS. 14-17. The only difference illustrated is the configuration of the through-hole 106 in the first component 102. Each of the configurations of the through-hole 106 can be achieved by using a different pin in an injection mold, were the pin corresponds to the configuration of the through-hole 106. Most door viewers have a 160 degree, 180 degree or 200 degree field of view and fit in a $\frac{9}{16}$ inch hole. Most door viewers have one of three sizes for the flange 22. Thus the most common door viewers can be accommodated with a common mold for the first component 102, where a relatively small number of pins (e.g., 3) can be interchanged in the mold to switch between the different configurations of the through-hole 106 allow the first component 102 to mate with most, if not all, commercially available door viewers.

The configuration of the door viewer cover 100 illustrated throughout the figures may be relatively difficult to bend and/or break, which should reduce the likelihood of damage during use. The difficulty to bend and/or break may be achieved if the first component 102 and the second component 104 are plastic.

While the present technology has been described in connection with several practical examples, it is to be understood that the technology is not to be limited to the disclosed examples, but on the contrary, is intended to cover various modifications and equivalent arrangements included within the spirit and scope of the technology.

The invention claimed is:

1. A door viewer cover comprising:

a first disc including a hole through a thickness of the first disc, wherein the hole is sized to mate with a door viewer on an inside of a door to allow a user to look through the hole and through the door viewer, and wherein a center of the hole is offset from a center of the first disc;

a second disc stacked on the first disc, wherein the second disc is sized to cover at least the hole to selectively block the user from looking through the hole;

a pin that connects the first disc to the second disc, wherein the pin is within an outer perimeter of the first disc and outside of the hole, and the pin allows the second disc to pivot relative to the first disc about an axial length of the pin, about a pivot axis defined by a head, so that the second disc can move between a blocking position of the hole and a non-blocking position of the hole while maintaining a substantially parallel relationship between the first disc and the second disc, wherein the pin is integrally formed with the second disc and comprises the head configured to be compressed for a snap-fit with the first disc, wherein the head defining the pivot axis includes a split defined therein extending along an axial direction of the pin so that the head is configured to be compressed for the snap-fit with the first disc; and wherein as viewed from above opposite sides of the split in the pin are aligned with a linear portion of an inner wall of the second disc so that a common plane is defined by the split and the inner wall of the second disc.

2. The door viewer cover according to claim 1, wherein the pin comprises the head on a distal end of the pin, the head having a first diameter that is bigger than a second diameter at a base of the pin.

3. The door viewer cover according to claim 2, wherein the head is inserted for a snap fitting in a hole in the first disc, the pin not being fixed to the first disc so that the first disc may rotate relative to the pin.

4. The door viewer cover according to claim 3, wherein the hole comprises a counter bore.

5. The door viewer cover according to claim 2, wherein the head comprises a gap configured to allow the head to be resiliently compressed so that the first diameter is reduced.

6. The door viewer cover according to claim 5, wherein the gap is configured to allow the head to be compressed so that the first diameter is substantially the same as the second diameter.

7. The door viewer cover according to claim 5, wherein the gap is off-center from a central axis of the pin towards an outer edge of the door viewer.

8. The door viewer cover according to claim 5, wherein the first diameter is off-center from a central axis of the pin towards the hole.

9. The door viewer cover according to claim 1, wherein the hole is one of a counter bored hole, a counter sunk hole and a straight hole.

10. The door viewer cover according to claim 1, wherein the first disc comprises at least one scallop in an outer perimeter of the first disc.

11. The door viewer cover according to claim 1, wherein the first disc comprises two scallops in an outer perimeter of the first disc and the second disc comprises two rotation direction indicators that are positioned over the two scallops, respectively, when the second disc is in the blocking position.

12. The door viewer cover according to claim 1, wherein the second disc comprises a blind hole on a side opposite the first disc.

13. The door viewer cover according to claim 12, further comprising a metal insert in the blind hole.

* * * * *